United States Patent [19]
Drew et al.

[11] Patent Number: 5,546,541
[45] Date of Patent: Aug. 13, 1996

[54] SYSTEM FOR ROUTING TRANSACTION COMMANDS TO AN EXTERNAL RESOURCE MANAGER WHEN THE TARGET RESOURCE IS NOT MANAGED BY THE LOCAL TRANSACTION MANAGING COMPUTER PROGRAM

[75] Inventors: Robert M. Drew, Cary, N.C.; Dennis L. Plum; Graham M. Walmsley, both of Hampshire, United Kingdom

[73] Assignee: International Business Machines Corporation, Armonk, N.Y.

[21] Appl. No.: 917,016

[22] PCT Filed: Feb. 5, 1991

[86] PCT No.: PCT/GB91/00170

§ 371 Date: Sep. 24, 1993

§ 102(e) Date: Sep. 24, 1993

[87] PCT Pub. No.: WO92/14205

PCT Pub. Date: Aug. 20, 1992

[51] Int. Cl.$^6$ ............................ G06F 15/16; G06F 15/76; G06F 13/38
[52] U.S. Cl. ................ 395/200.15; 395/800; 395/650; 395/860; 364/230.3; 364/230.1; 364/281.3; 364/281.8
[58] Field of Search .................................... 395/200, 800, 395/650, 200.15, 860; 340/172.5

[56] References Cited

U.S. PATENT DOCUMENTS

| | | | |
|---|---|---|---|
| 4,031,512 | 6/1977 | Faber | 340/147 R |
| 4,366,479 | 12/1982 | Mori et al. | 340/825.05 |
| 4,423,414 | 12/1983 | Bryant et al. | 340/825.07 |
| 4,510,492 | 4/1985 | Mori et al. | 340/825.05 |
| 4,648,061 | 3/1987 | Foster | 264/900 |
| 4,941,084 | 7/1990 | Terada et al. | 364/200 |
| 5,136,716 | 8/1992 | Harvey et al. | 395/800 |
| 5,155,808 | 10/1992 | Shimizu | 395/200 |
| 5,220,674 | 6/1993 | Morgan et al. | 395/800 |
| 5,287,537 | 2/1994 | Newmark et al. | 395/800 |

FOREIGN PATENT DOCUMENTS 62-43739  2/1987  Japan.

OTHER PUBLICATIONS

Uniforum Conference Proceedings, Jan. 23, 1990, Washington, US, pp. 157–167, "Considerations for Building Distributed Transaction Processing Systems on UNIX System V" by M. R. Hesselgrave.

Computer Communicatio Review, vol. 17, No. 5, Aug. 11, 1987, New York, US, pp. 245–253, "Strategies for Decentralized Resource Management", by M. Stumm.

Digital Technical Journal, vol. 3, No. 1, Jan. 1991, Maynard, US, pp. 33–44, "Transaction Management support in the VMS Operating System Kernel", by W. A. Laing et al.

Primary Examiner—Thomas C. Lee
Assistant Examiner—Rehana P. Krick
Attorney, Agent, or Firm—Whitham, Curtis, Whitham & McGinn; William A. Kinneman, Jr.

[57] ABSTRACT

A transaction managing system is described in which transaction commands must be routed to appropriate resource managers. The transaction managing system first determines the identity of the target resource from the transactions commands, and compares this with all the resources that it knows it manages itself. If the target resource is managed by the transaction processing system itself, then the transaction command is passed to a resource manager within the transaction managing system itself. If the transaction managing system does not recognize the resource then it sends a query message to each external resource manager to determine if any of these recognize the resource. If one of the external resource managers send an ownership message back to the transactions managing system admitting ownership of the target resource then the transaction command is passed to that external resource manager for processing.

13 Claims, 2 Drawing Sheets

SYSTEM FOR ROUTING TRANSACTION COMMANDS TO AN EXTERNAL RESOURCE MANAGER WHEN THE TARGET RESOURCE IS NOT MANAGED BY THE LOCAL TRANSACTION MANAGING COMPUTER PROGRAM

I. BACKGROUND OF THE INVENTION a. Field of the Invention

This invention relates to the field of data processing systems. More particularly, this invention relates to the field of transaction driven data processing systems.

b. Related Art

Transaction driven data processing systems such as the CICS/ESA program produced by International Business Machines Corporation are long-lived, large, and complex systems (CICS/ESA is a trade mark of International Business Machines Corporation). CICS/ESA manages the passing of transaction commands between a large number of resource managers. These resources can be terminals, storage systems, printers, application programs etc. Each of these different resources may require different instructions to drive it, and require quite different management support by the CICS/ESA program to which it is attached. Having the support for these resources supplied by the CICS/ESA program helps improve the integrity and efficiency of the system.

One way of dealing with the addition of a new type of resource (e.g. a new class of terminals, or a new communications system), is to add code to the CICS/ESA program to support that new type of resource. The result of this is that resource support requires an ever increasing overhead to be carried by the CICS/ESA program. Alternatively, a new portion of programming interface can be added to the transaction managing computer program, but this has the result that the existing application programs running on the system may need to be re-written to drive this new programming interface. These problems are compounded by the fact that new type of resources are being produced at an ever increasing rate, and requiring a new release of the CICS/ESA program to support each new resource or group of resources to be made available.

II. SUMMARY OF THE INVENTION

Viewed from one aspect (illustrated in FIG. 2) the invention provides a method of routing a transaction command within a data processing apparatus from a transaction managing computer program to a target resource manager coupled to said transaction managing computer program, comprising the steps of:

generating said transaction command (202), determining an identifier of a target resource from said transaction command (204), and comparing said determined identifier with identifiers of resources managed by said transaction managing computer program (206), and either (i) if said target resource is managed by said transaction managing computer program, said transaction managing computer program passing said transaction command to said target resource manager within said transaction managing computer program for processing (208, 210), or (ii) if said target resource is not managed by said transaction managing computer program, said transaction managing computer program identifying an external resource manager responsible for said target resource, and passing said transaction command to said responsible external resource manager for processing by said responsible external resource manager (208, 212, 214).

The invention both recognizes the existing problem and provides a solution to that problem. The invention recognizes that the transaction managing computer program (e.g. CICS/ESA) need not continue to provide all the resource support itself, but can delegate this to external resource managers. These external resource managers could be produced by the producer of the transaction managing computer program (without the need for a new release), or could be provided by the producer of the new resource wanting to be able to connect to the transaction managing computer program.

Splitting the resource management in this way gives rise to further problems. The transaction managing computer program must be able to decide between handling a particular transaction command itself or passing it to an external resource manager. The invention achieves this by causing that transaction managing computer program to determine the identity of the target resource from the transaction command and compare this with the resources it knows it supports itself. If the resource is not supported by the transaction managing computer program itself, it passes the raw transaction command to an external resource manager that has admitted ownership.

In the prior art systems the appropriate resource manager was determined by the particular programming interface that was being addressed. In contrast, with the invention the appropriate resource manager is determined from an identifier (name) of the target resource.

It will also be seen that application programs are able to use these new resources without any need to be altered to drive a new application programming interface. The application programs use the native application programming interface of the transaction processing system, and are able to unknowingly use the new resources.

Determining the identity of the target resource may be done by parsing the transaction command for a target resource name, or in the case where no target resource was explicitly specified in the transaction command, could be taken to be the resource that initiated that transaction command or inherited from an earlier command, e.g. an initial file request that names the file is then followed by a series of Get-Next-Record commands issued to browse through the file without naming the particular file/record.

It will be appreciated that merely detecting that a resource is not owned by the transaction managing computer program may not be sufficient to determine where else the transaction command should be sent. There may be more than one external resource manager attached to the transaction managing computer program, and any of these could be the responsible external resource manager. Accordingly, in preferred embodiments of the invention, said step of identifying said responsible external resource manager includes the steps of: sending a query message including said determined identifier to external resource managers coupled to said transaction managing computer program querying if each said external resource manager is responsible for said target resource, and receiving an ownership message generated by an external resource manager identifying itself as said responsible external resource manager. This preferred feature provides considerable flexibility as it allows any number of external resource managers to be dynamically connected or disconnected. Using this feature allows resources to be supported without having first informed the transaction managing computer program of which resources they manage.

As an aid to the efficiency of the system said step of identifying said responsible external resource manager includes the steps of: sending a query message including said determined identifier to a dictionary of resources and their responsible resources managers, and receiving an ownership message indicating which external resource manger is responsible for said target resource. This technique can be used so that the dictionary is polled first to see if the transaction managing computer program has previously learnt which is the responsible resource manager before going to the trouble of querying all the attached resource external resource managers.

Most external resource managers are not able to support the full range of types of transaction commands that may be generated. Accordingly, in preferred embodiments of the invention, when an external resource manager is coupled to said transaction managing computer program, said external resource manager registers with said transaction managing computer program as able to process a subset of types of transaction commands. With this feature the transaction managing computer program is able to avoid the problem of sending a transaction command to an external resource manager that is unable to handle that transaction command.

In order to further speed up operation of the system the transaction managing computer program is able to use the registration so that a query message is only sent to those external resource managers registered as able to process that type of transaction command being routed.

A disadvantage of such querying of the external resource managers is that it brings with it a speed penalty. Accordingly, in preferred embodiments of the invention when said transaction managing computer program receives said ownership message, said responsible external resource manager is recorded as being responsible for said target resource, such that subsequently, said external resource manager may be directly identified as said responsible external resource for said target resource. This feature has the result that the system need only go through the query procedure once, and can thereafter make a more efficient direct call. In preferred embodiments, when an external resource manager admits ownership of a resource this knowledge is only remembered for the lifetime of the particular application program making the request, not the lifetime of the whole transaction processing system, i.e. the next application program that wants the same resource can go through the query process again.

In the case where there are a larger number of external resource managers to be queried, a significant advantage can be gained by the preferred feature that when an external resource manager is coupled to said transaction managing computer program, said external resource manager sends said transaction managing computer program a priority message, and said transaction managing computer program uses such priority messages to determine in what order said external resource managers will be sent said query message. This feature allows external resource managers that handle a larger number of resources to be queried first, as it is more likely that such external resource managers will turn out to be the responsible external resource manager for any given unknown target resource.

Another gain in efficiency can be gained in the case of a transaction that is initiated by a resource managed by an external resource manager. In preferred embodiments of the invention when a resource managed by an external resource manager initiates a transaction in the transaction managing computer program, said initiating external resource manager identifies itself to said transaction processing computer program as being responsible for said initiating resource. Thus if a resource has used the transaction managing computer program before, its location will subsequently be known without further action.

The advantage of the above feature is particularly apparent in situations wherein upon generation of a subsequent transaction command, in reply to said initiating transaction, for which said initiating resource is said target resource, said initiating resource manager is directly identified by said transaction processing computer program as said responsible external resource. Accordingly, in preferred embodiments of the invention said responsible external resource manager for subsequent transaction commands which pertain to said initiated transaction is directly identified by said transaction processing computer program.

Viewed from another aspect the invention provides a data processing apparatus having a transaction managing computer program adapted to cooperate with an external resource manager to route a transaction command from said transaction managing computer program to a target resource manager coupled to said transaction managing computer program, said transaction managing computer program comprising:

means for generating said transaction command, means for determining an identifier of said target resource from said transaction command, and means for comparing said determined identifier with identifiers of resources managed by said transaction managing computer program, and either (i) if said target resource is managed by said transaction managing computer program, passing said transaction command to said target resource manager within said transaction managing computer program for processing, or (ii) if said target resource is not managed by said transaction managing computer program, identifying an external resource manager responsible for said target resource, and passing said transaction command to said responsible external resource manager for processing by said responsible external resource manager.

It will be appreciated that further aspect of this invention provides a data processing apparatus having an external resource manager adapted to cooperate with a transaction managing computer program to route a transaction command from said transaction managing computer program to said external resource manager, said external resource manager comprising:

means for receiving a query message from said transaction managing computer program querying if said external resource manager is responsible for a target resource, means for generating and sending to said transaction managing computer program an ownership message indicating whether said external resource manager is responsible for said target resource, and means for processing said transaction command if said external resource manager is responsible for said target resource.

The transaction managing computer programs and the external resource managers must both be specially adapted to practice this invention. The transaction managing computer program must be able to hand over responsibility to external resource managers, and those external resource managers must be able to carry out that responsibility. These are two aspects of the same invention.

III. BRIEF DESCRIPTION OF THE DRAWING

IV. DETAILED DESCRIPTION OF THE PREFERRED EMBODIMENTS

Figure 1:
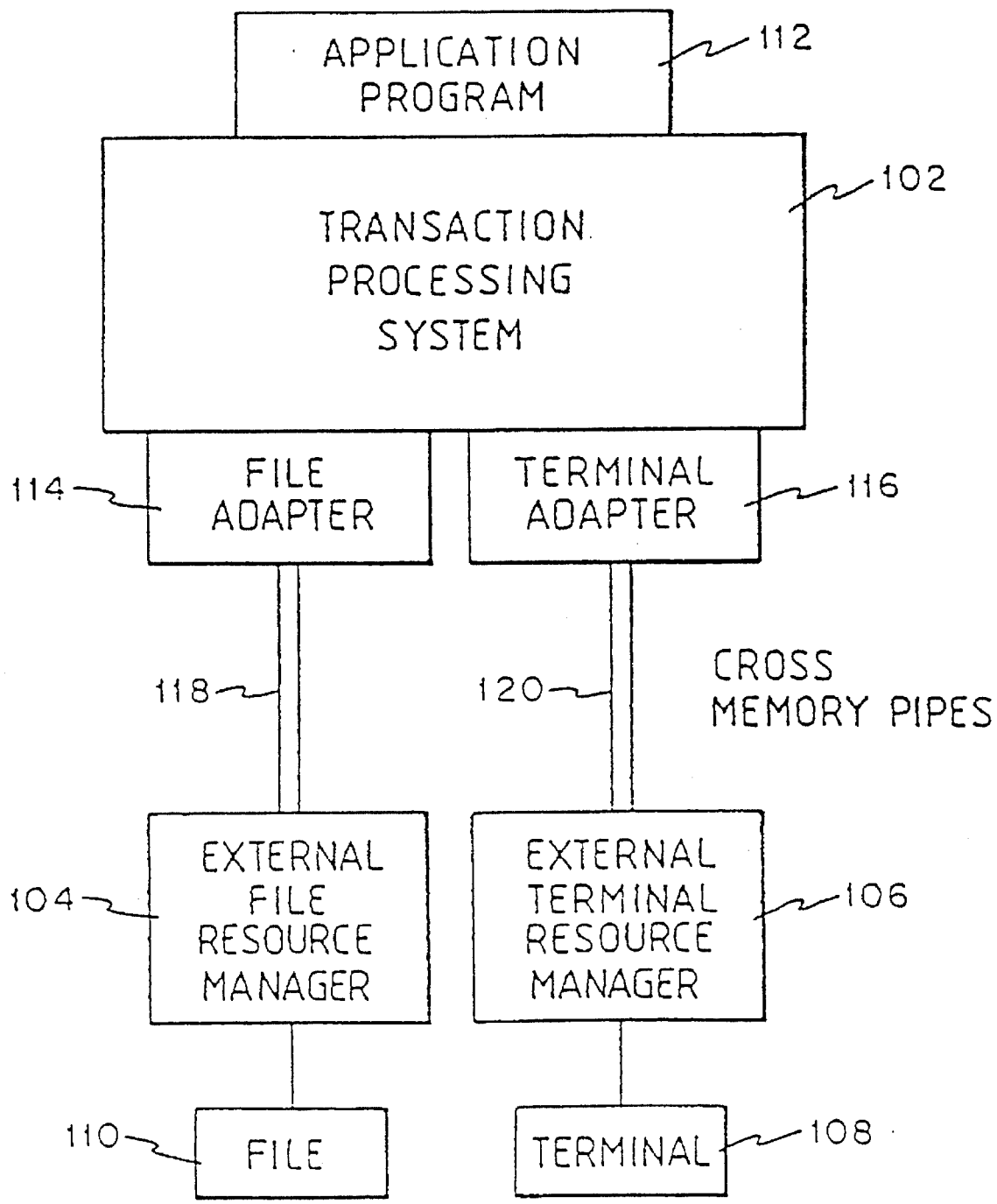
FIG. 1 is a schematic illustration of the configuration of the software components in an embodiment of the present invention with two external resource managers.
Figure 2:
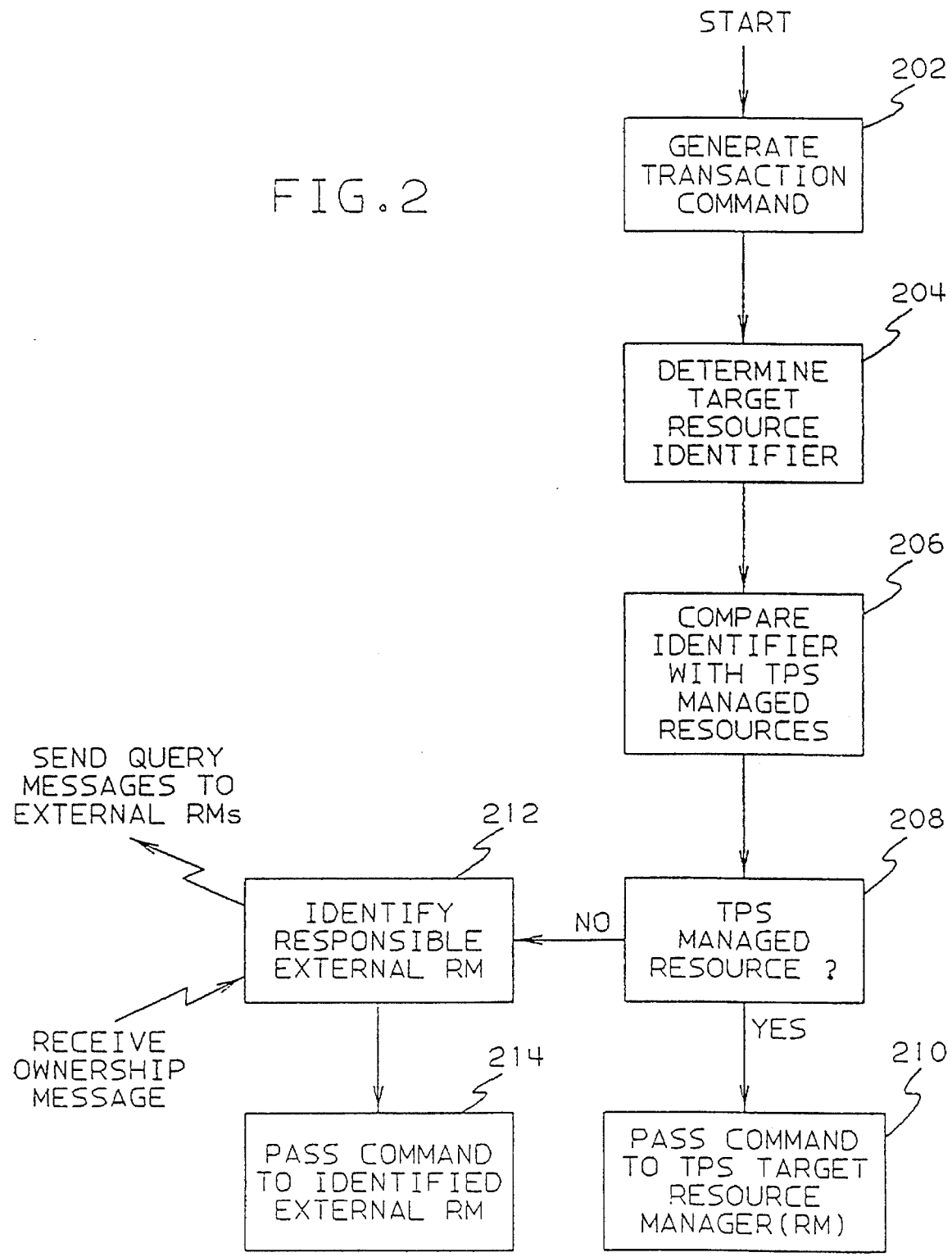
FIG. 2 is a flow chart of a method of routing a transaction command according to an embodiment of the present invention.

An embodiment of the invention will now be described, by way of example only, with reference to the accompanying drawing which schematically illustrates the configuration of the software components in an embodiment of the invention with two external resource managers.

In this example a transaction managing computer program 102 (or transaction processing (TP) system) uses this invention to provide support for two external resource managers (RM) 104, 106. One RM 106 provides support for terminals 108 and the other RM 104 provides support for data files 110. It is assumed that the TP system already has its own RMs for terminals and files, and provides a set of commands that application programs (A/P) 112 use to access those resources. The external RMs provide support for different types of terminals and files, but ones that wish to use the commands of existing A/Ps.

It is assumed that each external RM, and the TP system, occupy their own address space. Each external RM provides some adapter code 114, 116 that resides in the address space of the TP system. The interfaces provided by the TP system that interact with the adapter are important features of this invention. The adapter code communicates with its RM through a cross memory pipe 118, 120 but other forms of communication may be used.

The function of the adapter code 114, 116 is to;

Register the presence and interests of the external RM 104, 106 to the TP system 102;

Pass data from the external RM 104, 106 to the TP system 102, or to an A/P 112 that is executing in the TP system 102;

Pass the commands that the A/P 112 has issued to the external RM 104, 106 for processing;

Respond to a 'query' command from the TP system 102;

Maintain the correlation between an A/P 112 and the specific external resource it is using.

The logic of this example is as follows;

The TP system 102 is assumed to be active and executing application programs 112 that use resource managers within the TP system itself.

1. The external terminal and file resource managers 104, 106 are initialized.

2. A terminal 108 managed by the external terminal RM 106 enters data to request that an A/P 112 be initiated in the TP system 102.

3. That A/P 112 issues a command to retrieve data from a file 110 that is managed by the external file RM 104.

4. That A/P 112 issues a request to send data back to the terminal 108 that initiated the A/P 112.

5. The A/P 112 terminates.

Initializing the external RMs to the TP system:

After each external RM has initialized itself, and its adapter and the communications pipe between the two, it must register itself and its functions to the TP system. This is done with an ENABLE command;

```
ENABLE RM(name)         /* Name of the external RM
API-TYPE(type)          /* Which commands the RM can
                           process
PRIORITY(number)        /* Priority of RM for query
                           commands
ENTRY-POINT(address)    /* Entry point address
```

Notes;

The API-TYPE(type) keyword indicates which type of A/P commands this RM can process. The terminal RM 106 will state it can handle terminal commands, and the file RM 104 will indicate it can process file commands.

The PRIORITY(number) keyword is used when more than one external RM has registered interest in a given API-TYPE(type). When the TP system 102 needs to issue a query command (see later for a description of this), the PRIORITY(number) is used by the TP system to determine the order in which the external RMs are polled to determine if they own the resource.

The ENTRY-POINT(address) keyword is the address within the adapter where the the A/P commands will be passed to.

TP system responsibilities;

The TP system 102 records the name of the RM, and the entry point address, and the type of API commands the RM can process.

Terminal Input Initiates an A/P

A terminal that is managed by the external terminal RM enters data to initiate an A/P.

The adapter issues the following command;

```
CREATE A/P(name)    /* Initiate this A/P
RM(name)            /* Name of the RM that managed the
                       terminal
TOKEN(token)        /* Refer to notes below
```

Notes;

TP system responsibilities;

The TP system 102 initiates the required A/P 112, and records that it was initiated from a terminal 108 managed by a external terminal RM 106 rather than from a terminal managed by the terminal RM of the TP itself.

At various points during the execution of the A/P, the external RM and the TP system need to be able to correlate which particular resource is being used by which A/P. To achieve this correlation they exchange and manage TOKENs.

External RM responsibilities;

Process the data from the terminal and determine which A/P is to be initiated.

To maintain the TOKEN and relate it to the specific terminal that entered data.

The A/P issues a command to retrieve data from a file that is owned by the external file RM The A/P 112 issues a command to retrieve data from a file, e.g.

```
READ FILENAME(name)    /* Name of the file
RECORD(id)             /* Which record is to be retrieved
```

Notes;

This command uses the standard application program interface (API) of the TP system. The A/P is not aware of whether the file is managed by the TP system itself or by an external file RM.

TP system responsibilities;

The TP system 102 first assumes that it manages the file named in this request. When it discovers it does not own this file it checks to see if any external RM has registered with the TP system and has stated in the ENABLE command that it can process API requests for file resources. If no external RM has registered with ENABLE API-TYPE(file) then the TP system rejects the A/P command.

If an external RM has registered with ENABLE API-TYPE(file), the TP system will issue its QUERY command to that RM to determine if the external RM manages this particular resource, i.e.

QUERY RESOURCE(name) /* Do you manage this resource

The external RM must respond either,

'yes' I own this resource, or

'no' I do not own this resource

If an external RM responds positively the TP system passes the A/P command to it for processing. Included in this command will be a TOKEN that represents the A/P which the external RM will use to correlate this request to the A/P.

Note that more than one external RM may have registered with the TP system with API-TYPE(file). Under these circumstance the PRIORITY(value) specified in the ENABLE command is used by the TP system to determine the order in which each of the RMs are queried to see if they own the resource. The first external RM to respond positively to the query will receive the command.

If no external RM responds positively to the query command, then the TP system will reject the command.

External RM responsibilities;

The external RM (or its adapter) must respond to the QUERY command.

When the A/P command is passed to the external RM, it must process it (e.g. transform it into a form its resources require and execute it).

When the processing is complete the external RM must return the necessary information to the A/P. This information may include data, resource status, command return code etc. All this information must be returned in the manner and form the A/P would expect the TP system to return it if the resource were managed by the TP systems own RM.

The A/P issues a command to send data back to the terminal

The A/P issues;

SEND DATA(data)

Note that the resource is not identified in the command. This is the normal method the TP system provides to an A/P that needs to send data back to the terminal that initiated that A/P. The TP system would have recorded which terminal initiated the A/P and will direct the command to that resource.

TP system responsibilities;

Identify the terminal that initiated the A/P.

If that terminal is managed by the TP systems terminal RM then process that command in the traditional manner.

If that terminal is owned by an external terminal RM the command is passed to that RM for processing.

The TP system will pass the previously agreed TOKEN with the SEND command so that the external RM can correlate this request with the specific resource.

External RM responsibilities;

To send the data to the terminal that initiated the A/P.

A/P Termination

When any A/P terminates the TP system will notify all external RM's that have been involved in that A/P of that termination. Parameters that are passed include notification of whether the termination was normal or abnormal, and the TOKEN that identifies the A/P.

TP system responsibilities;

To pass the termination command to the external RM

External RM responsibilities;

The external RM does not send any response back to the TP system when it receives the termination command. It may choose to ignore it, but it is to be expected that it will need this command to restore the state of its resources., e.g. to release a terminal or syncpoint a file.

Having thus described our invention, what we claim as new and desire to secure by Letters Patent is:

1. A computer implemented method of routing a transaction command within a transaction driven data processing apparatus from a transaction managing computer program to a target resource manager coupled to said transaction managing computer program, comprising the steps of:

generating said transaction command by an application program running on said transaction driven data processing apparatus, determining an identifier of a target resource from said transaction command by the transaction managing computer program, comparing said determined identifier with identifiers of resources managed by said transaction managing computer program, and either (i) if said target resource is managed by said transaction managing computer program, said transaction managing computer program passing said transaction command to said target resource manager within said transaction managing computer program for processing, or (ii) if said target resource is not managed by said transaction managing computer program, said transaction managing computer program identifying an external resource manager responsible for said target resource, and passing said transaction command to said responsible external resource manager for processing by said responsible external resource manager, and wherein when an external resource manager is coupled to said transaction managing computer program, said external resource manager sends said transaction managing computer program a priority message, and said transaction managing computer program uses said priority message to determine in what order said external resource managers will be sent query messages.

2. The computer implemented method of claim 1, wherein said step of identifying said responsible external resource manager includes the steps of:

sending a query message including said determined identifier to external resource managers coupled to said transaction managing computer program querying if each said external resource manager is responsible for said target resource, and receiving an ownership message generated by an external resource manager identifying itself as said responsible external resource manager.

3. The computer implemented method of claim 1, wherein said step of identifying said responsible external resource manager includes the steps of:

sending a query message including said determined identifier to a dictionary of resources and their responsible resource managers, and receiving an ownership message generated by an external resource manager identifying itself as said responsible external resource manager.

4. The computer implemented method of claim 2, wherein said step of identifying said responsible external resource manager includes the steps of:

sending a query message including said determined identifier to a dictionary of resources and their responsible resources managers, and receiving an ownership message indicating which external resource manger is responsible for said target resource.

5. The computer implemented method of claim 3, wherein when an external resource manager is coupled to said transaction managing computer program, said external resource manager registers with said transaction managing computer program as able to process a subset of types of transaction commands.

6. The computer implemented method of claim 4, wherein when an external resource manager is coupled to said transaction managing computer program, said external resource manager registers with said transaction managing computer program as able to process a subset of types of transaction commands.

7. The computer implemented method of claim 2, wherein a query message is only sent to those external resource managers registered as able to process that type of transaction command being routed.

8. The computer implemented method of claim 4, wherein a query message is only sent to those external resource managers registered as able to process that type of transaction command being routed.

9. The computer implemented method of claim 6, wherein a query message is only sent to those external resource managers registered as able to process that type of transaction command being routed.

10. The computer implemented method of claim 5, wherein when said transaction managing computer program receives said ownership message, said responsible external resource manager is recorded as being responsible for said target resource, such that subsequently, said external resource manager may be directly identified as said responsible external resource for said target resource.

11. The computer implemented method of claim 10, wherein when a resource managed by an external resource manager initiates a transaction in the transaction managing computer program, said initiating external resource manager identifies itself to said transaction processing computer program as being responsible for said initiating resource.

12. The computer implemented method of claim 11, wherein said responsible external resource manager for subsequent transaction commands which pertain to said initiated transaction is directly identified by said transaction processing computer program.

13. A transaction driven data processing apparatus comprising:

at least one external resource manager connected to the transaction driven data processing system, a transaction managing computer program cooperating with a connected external resource manager to route a transaction command from said transaction managing computer program to a target resource manager coupled to said transaction managing computer program, an application program running on said transaction driven data processing apparatus generating said transaction command, said transaction managing computer program determining an identifier of said target resource from said transaction command, and comparing said determined identifier with identifiers of resources managed by said transaction managing computer program, either (i) if said target resource is managed by said transaction managing computer program, passing said transaction command to said target resource manager within said transaction managing computer program for processing, or (ii) if said target resource is not managed by said transaction managing computer program, identifying an external resource manager responsible for said target resource, and passing said transaction command to said responsible external resource manager for processing by said responsible external resource manager, and wherein when an external resource manager is coupled to said transaction managing computer program, said external resource manager sends said transaction managing computer program a priority message, and said transaction managing computer program uses said priority message to determine in what order said external resource managers will be sent query messages.

* * * * *

UNITED STATES PATENT AND TRADEMARK OFFICE
CERTIFICATE OF CORRECTION

PATENT NO. : 5,546,541
DATED : August 13, 1996
INVENTOR(S) : Robert M. Drew, Dennis L. Plum, and Graham M. Walmsley It is certified that error appears in the above-indentified patent and that said Letters Patent is hereby corrected as shown below:

TITLE PAGE:

Under the section entitled "Attorney, Agent, or Firm", please correct "Kinneman" to --Kinnaman--.

Signed and Sealed this

Eighteenth Day of February, 1997

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,546,541

DATED : August 13, 1996

INVENTOR(S) : Drew et al.

It is certified that error appears in the above-identified patent and that said Letters Patent is hereby corrected as shown below:

Col. 9, line 14,          delete "manger" and insert --manager--
claim 4

Signed and Sealed this

Twenty-second Day of April, 1997

*Attest:*

BRUCE LEHMAN

*Commissioner of Patents and Trademarks*

*Attesting Officer*